United States Patent

Matthias et al.

[11] Patent Number: 5,813,304
[45] Date of Patent: Sep. 29, 1998

[54] SPLICE CUTTING AND FILM RE-SHAPING APPARATUS

[75] Inventors: William Thomas Matthias, Rochester; William James Greene, Webster; Dennis Francis Tianello, Spencerport, all of N.Y.

[73] Assignee: Eastman Kodak Company, Rochester, N.Y.

[21] Appl. No.: 816,472

[22] Filed: Mar. 13, 1997

Related U.S. Application Data

[63] Continuation of Ser. No. 410,185, Mar. 24, 1995, abandoned.

[51] Int. Cl.⁶ .......................................................... B26D 1/00
[52] U.S. Cl. ................................... 83/365; 83/370; 83/444; 83/446; 83/948
[58] Field of Search ............................. 83/618, 620, 681, 83/682, 683, 691, 694, 948, 949, 917, 934, 444, 446, 687, 48, 52, 828, 821, 824, 422, 436, 420, 370, 365, 445

[56] References Cited

U.S. PATENT DOCUMENTS

| 2,779,408 | 1/1957 | Miller et al. ............................. 83/52 X |
| 3,248,988 | 5/1966 | Janczy ................................... 83/620 X |
| 3,282,141 | 11/1966 | Gautron ................................ 83/620 X |
| 3,499,202 | 3/1970 | Napor et al. ........................... 29/564.6 |
| 3,586,225 | 6/1971 | Horlezeder ............................. 242/524 |
| 3,634,171 | 1/1972 | Rosborough, Jr. ..................... 156/506 |
| 3,699,832 | 10/1972 | Smith et al. ............................. 83/210 |
| 3,713,357 | 1/1973 | Keith ..................................... 83/444 X |
| 3,717,057 | 2/1973 | Takimoto ................................... 83/98 |
| 3,763,728 | 10/1973 | Blackman ............................. 83/446 X |
| 3,850,778 | 11/1974 | Gnage ................................... 156/502 X |
| 3,854,357 | 12/1974 | Kron ....................................... 83/105 |
| 4,056,024 | 11/1977 | Baert et al. ............................... 83/210 |
| 4,094,723 | 6/1978 | Jones ..................................... 156/353 |
| 4,435,008 | 3/1984 | Strunc .................................... 83/210 X |
| 4,466,316 | 8/1984 | Kobayashi et al. ......................... 83/13 |
| 4,567,653 | 2/1986 | Heller et al. .......................... 29/741 X |
| 4,773,293 | 9/1988 | Mizuta et al. ............................. 83/39 |
| 4,819,530 | 4/1989 | Huang ................................... 83/13 X |
| 4,957,247 | 9/1990 | Nakamura et al. .................. 242/532.7 |
| 4,994,214 | 2/1991 | Stevens et al. ......................... 264/476 |
| 5,022,296 | 6/1991 | Eschauzier et al. ....................... 83/27 |
| 5,031,495 | 7/1991 | Kogane et al. ........................... 83/105 |
| 5,125,630 | 6/1992 | Hoyt et al. .......................... 242/532.6 |
| 5,263,393 | 11/1993 | Long et al. ............................. 83/320 |
| 5,276,954 | 1/1994 | Gerrans et al. ....................... 29/564.6 |
| 5,333,365 | 8/1994 | Marocco et al. ..................... 83/562 X |
| 5,349,730 | 9/1994 | Anderson et al. ................... 83/76.8 X |
| 5,479,691 | 1/1996 | Shimizu et al. ..................... 83/948 X |
| 5,595,101 | 1/1997 | Yoshimatsu et al. ...................... 83/40 |

FOREIGN PATENT DOCUMENTS

| 0 584 583 | 3/1994 | European Pat. Off. . |
| 91/06890 | 5/1991 | WIPO . |

*Primary Examiner*—Maurina T. Rachuba
*Attorney, Agent, or Firm*—Frank Pincelli; David A. Novais

[57] ABSTRACT

An apparatus for cutting and desplicing a roll of spliced films, being transported through the apparatus, to form filmstrip leading and trailing ends and re-shaping each end to their desired configurations having, a splice cutter located along the film path for forming two filmstrip ends with residual splices thereon, punch and die assemblies located adjacent to the splice cutter for re-shaping the ends of the filmstrip and removing the residual splice, moveable alignment guides located adjacent to each punch and die assembly, for aligning the film prior to cutting and re-shaping operations, a plurality of flexible guides located along the film path for guiding the spliced and despliced films along the film path, and an aperture located below the splice cutter, underneath the film path, for disposing of the removed residual splices, is described. A method for cutting and re-shaping the ends of a filmstrip using the apparatus is also described.

15 Claims, 10 Drawing Sheets

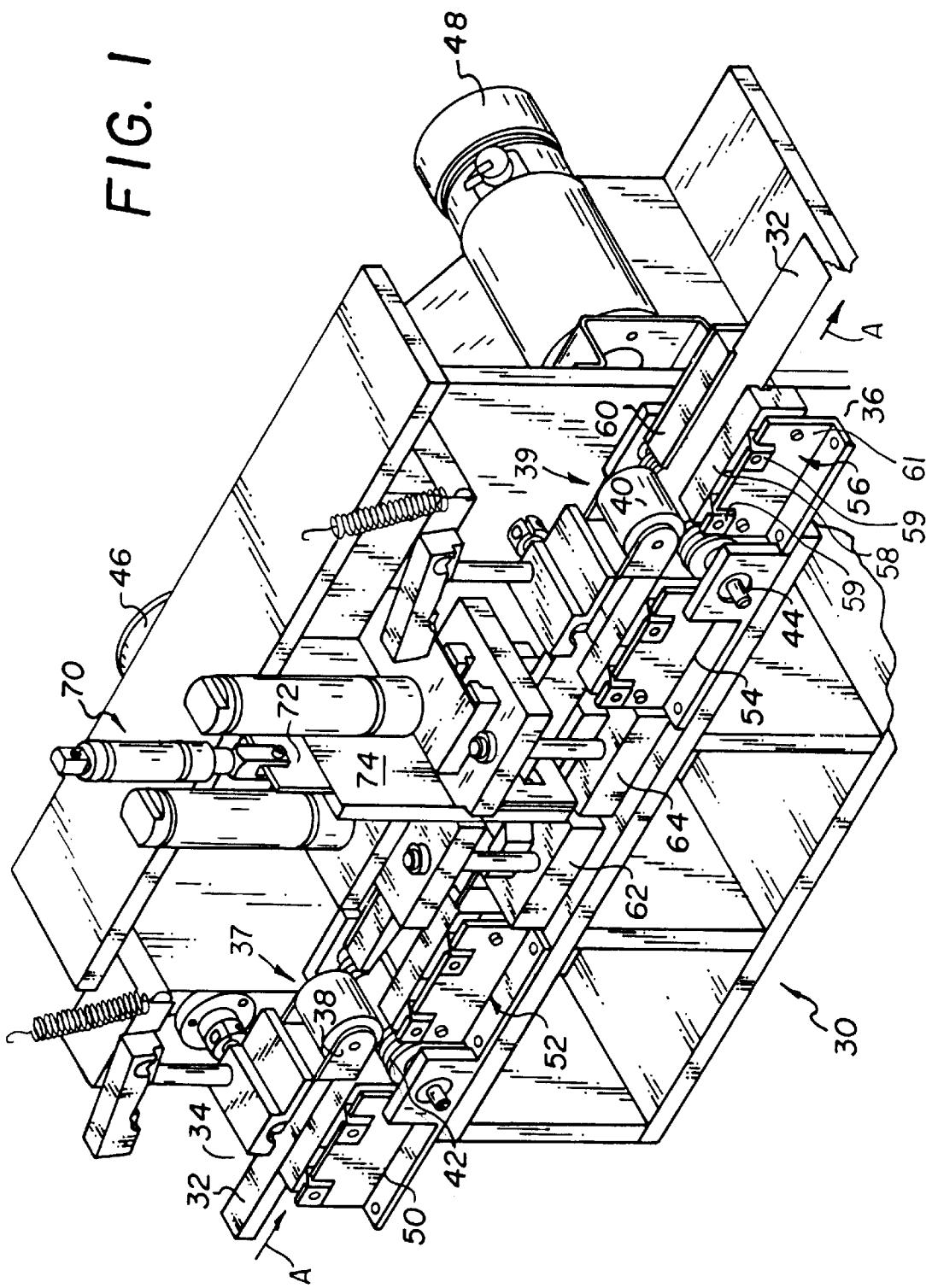

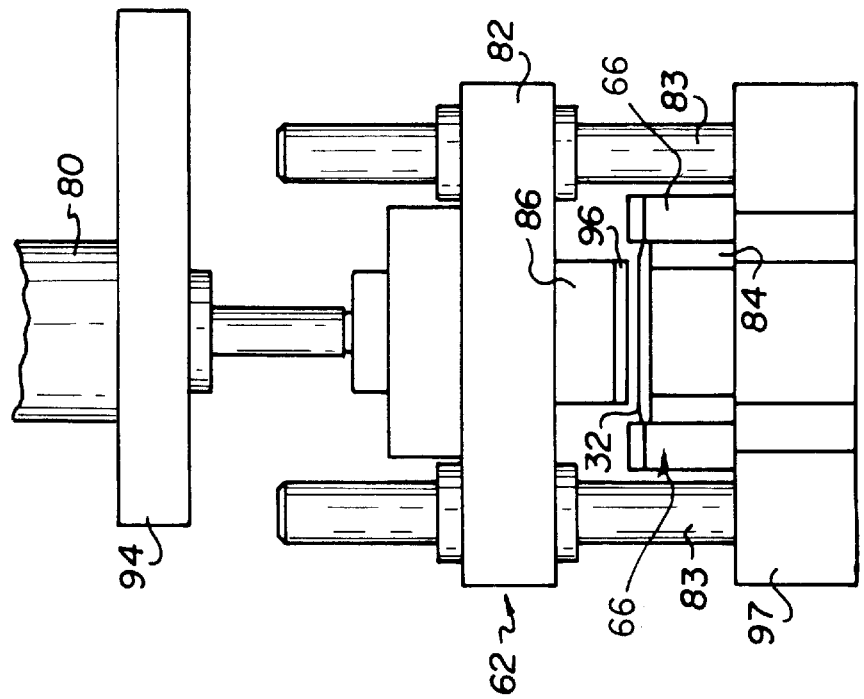
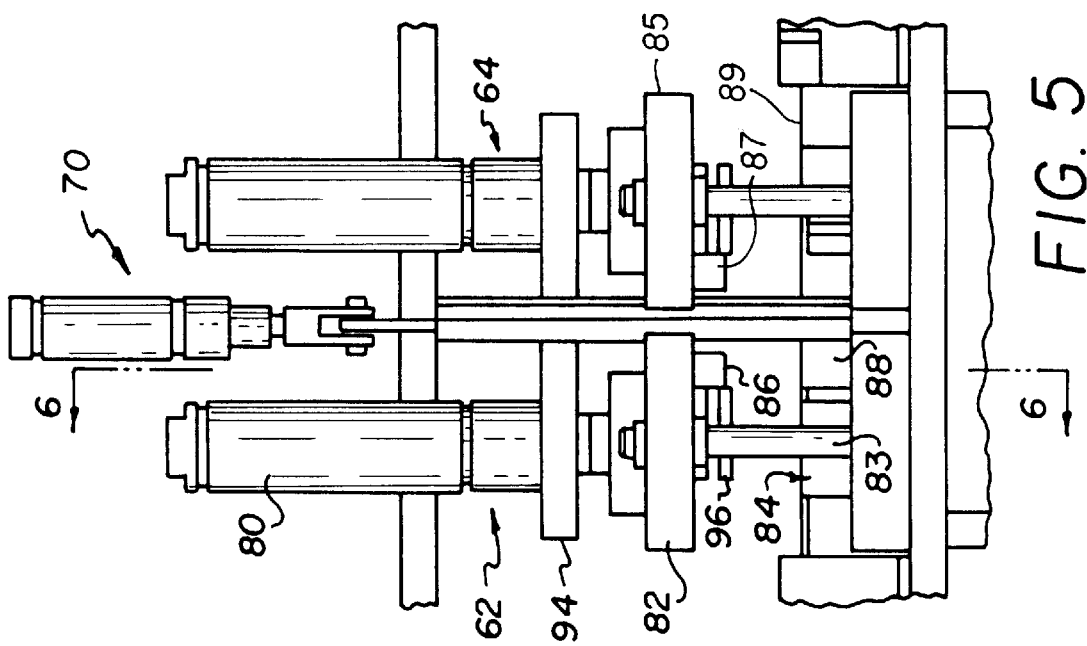
FIG. 6
FIG. 5

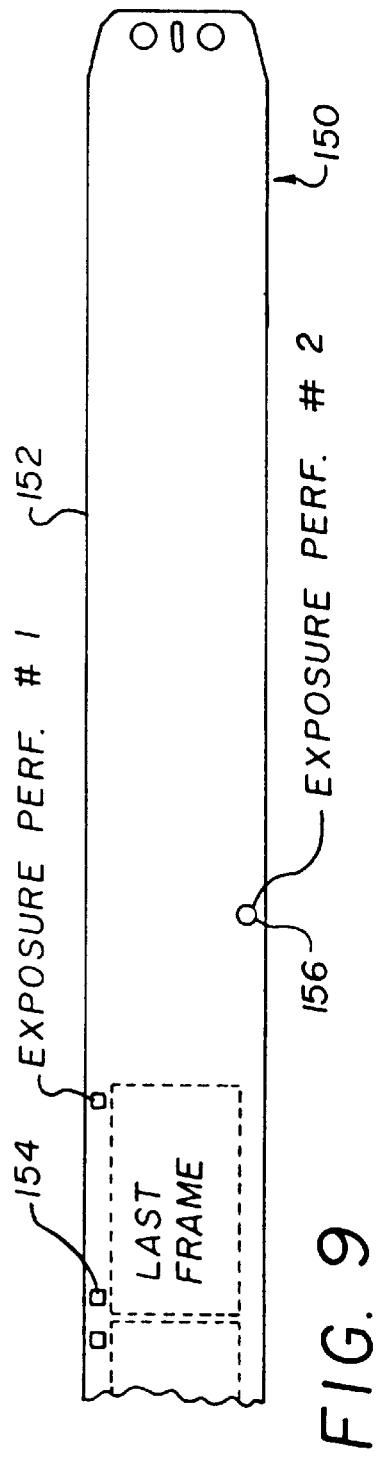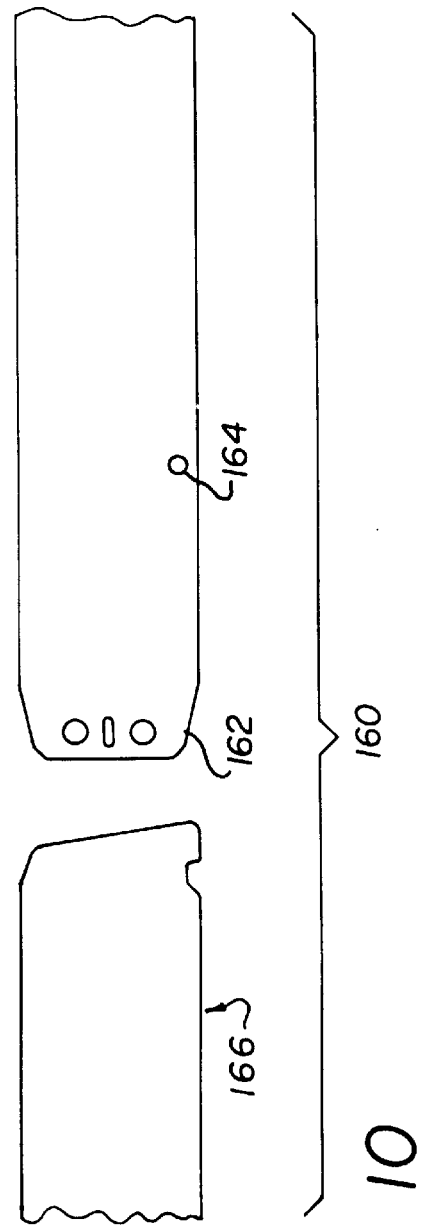

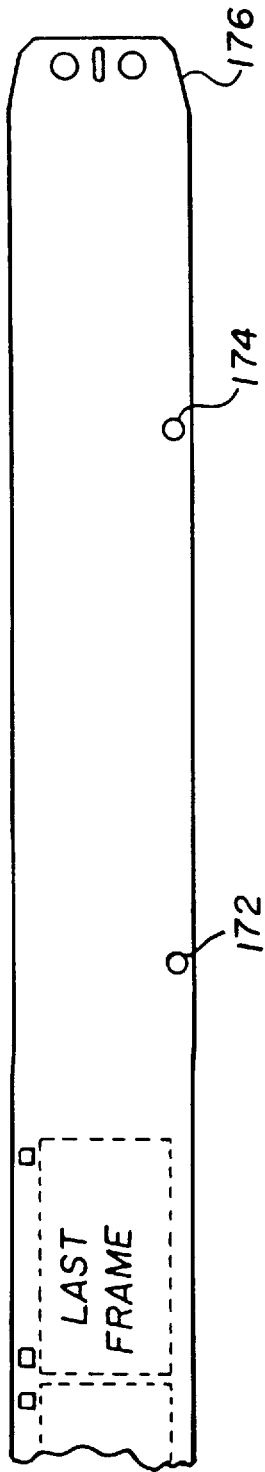
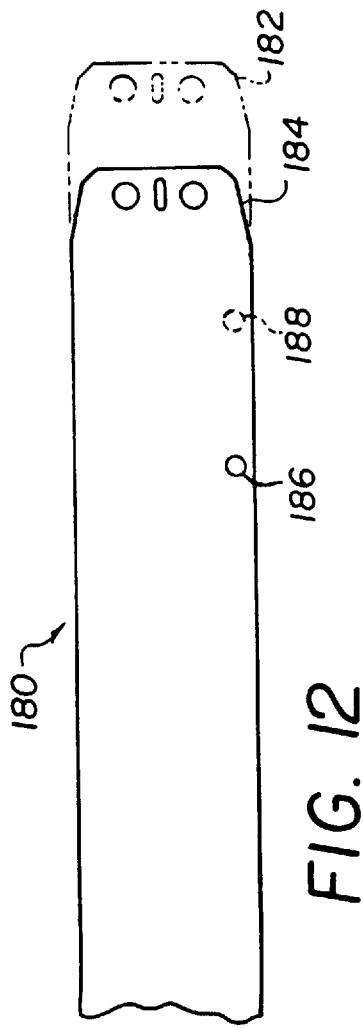

SPLICE CUTTING AND FILM RE-SHAPING APPARATUS

This is a continuation of application Ser. No. 08/410,185, filed Mar. 24, 1995, now abandoned.

FIELD OF THE INVENTION

This invention relates to photo finishing equipment and in particular to an apparatus for cutting spliced rolls of film to remove film-splicing tape and re-shaping the end of the film in a desired configuration and to a method for performing the same.

BACKGROUND OF THE INVENTION

In photographic film processing one or both ends of the filmstrip need to be in an acceptable condition to perform certain tasks. In order to do this the leader and the trailer ends of the filmstrip must conform to the proper shape. These ends may become disabled due to abuse or inadvertent damage or through the use of a splice tape meant to provide a purpose for another application. It is therefore necessary that the damaged end or ends of the filmstrip be returned to their original condition before the task can be performed.

Currently the leading and trailing ends of photographic film, such as 35 mm film, are square cut during splicing and heat seal splicing tape is applied to join the filmstrips together for continuous processing and printing in a large photo finishing laboratory. At finishing the filmstrip is cut into strips, for example strips of four frames, and returned to the customer along with an attached film splice label. A new photographic system is contemplated which requires the film to be returned to a cartridge, for example the customer's original cartridge. This will require filmstrip geometry to be retained by reforming the end of the filmstrip after processing of the spliced film.

One method of accomplishing this function is to remove the splice tape by cutting and then re-shaping the cut ends. By cutting the spliced film to remove the splice tape rather than using thermal desplicing methods, concern that adhesive residue on the film ends is being returned to the customer which might cause a future problem in the cartridge is eliminated. A problem with spliced film is that the splice is frequently skewed and the films are misaligned so that on cutting the splice the filmstrip ends have to be repositioned for precise re-shaping.

Photographic film materials used for roll films have an inherent tendency to set when wound around a core, such as a film spool. The problem of core-set is troublesome in photographic processing when the film is cut. The cut end has a pronounced tendency to curl which can interfere with film transporting and film positioning in the subsequent processing operations.

U.S. Pat. No. 3,499,202 discloses a machine for cutting a continuous roll of unexposed movie film into controlled lengths for loading into film cartridges and re-shaping the leading and trailing ends of the cut film to facilitate its loading into a cartridge. A punching assembly is provided which simultaneously punches the leading end of the rolled filmstrip and the trailing end of the next filmstrip to be rolled.

U.S. Pat. No. 3,586,258 discloses a method and an apparatus for loading unexposed photographic film in tape form into a cassette. After a length of film is wound onto the cassette the film is stopped and cut to provide a trailing end for the film in the cassette and a leading end of new film to be inserted in a new cassette. A punch is provided for punching the leading end to provide an anchoring means for attaching to the cassette spool.

U.S. Pat. No. 3,854,357 discloses a method and an apparatus for removing an imperfect portion of a web to form trailing and leading web portions, and splicing the web portions to form a continuous perfect web. The apparatus comprises knife blades for separating the imperfect portion and a guiding member for aligning and positioning the leading web end with the trailing web end to be spliced.

U.S. Pat. No. 4,994,214 discloses a process for making oriented photographic polyethylene terephthalate film having a controlled amount of curl.

In the present application the term "end-locating distance" defines a length corresponding to the distance, in a photographic film having a filmstrip exposure area on a portion of the film and a filmstrip trailing end, which is greater than the length of the filmstrip remaining inside a corresponding film cartridge with a spool core to which the trailing end is attached when the film is fully withdrawn and is still attached to the spool core and less than the distance from the end of the exposure area to the physical end of the filmstrip trailing end.

There is a need for an apparatus which accurately positions and aligns spliced filmstrips for cutting, re-positions and re-shapes the newly formed cut-ends in the desired configurations with removal of the film splice, and re-positions the despliced filmstrips for transport to subsequent photo finishing operations.

SUMMARY OF THE INVENTION

Briefly stated and in accordance with one aspect of this invention there is provided, an apparatus for cutting and desplicing a roll of spliced film being drawn from a supply reel along a film path through the apparatus to form filmstrip leading and trailing ends and re-shaping each end to their desired configurations, the apparatus comprising, a splice cutter, located along the film path, having first and second sides, for forming two filmstrip ends with residual splices thereon, a first punch and die assembly located adjacent to the first side of the splice cutter for re-shaping the trailing end of the filmstrip and removing the residual splice, a second punch and die assembly located adjacent to the second side of the splice cutter for re-shaping the leading end of the filmstrip and removing the residual splice, first and second moveable alignment guides, the first alignment guide located adjacent to the first punch and die assembly, the second alignment guide located adjacent to the second punch and die assembly, for aligning the film prior to cutting and re-shaping operations, and a plurality of flexible guides, at least one of the plurality of flexible guides located adjacent to a side of each of the first and second punch and die assemblies remote from the splice cutter, for guiding a spliced film and a despliced film along the film path.

In another aspect of the invention there is provided a film mover located along the film path for transporting the films through the apparatus.

In another aspect of the invention there is provided a sensor located along the film path for sensing the film splice, so that a control device is signaled to interrupt film transport while re-shaping of a filmstrip end is carried out.

In another aspect of the invention there is provided an apparatus in which a moveable alignment guide comprises an edge guide assembly mounted on both sides of the film path, the edge guide assembly comprising first and second fixed edge guides located on either side of the film path, and first and second moveable edge guides located on either side of the film path above the fixed edge guides, for aligning and supporting the filmstrip for cutting and re-shaping operations, wherein the moveable edge guides support the filmstrip for cutting and the fixed edge guides support the filmstrip for re-shaping operations.

In another aspect of the invention there is provided an apparatus in which a punch and die assembly comprises an elongated upper punch plate formed at a short end in the desired trailing end-of-filmstrip configuration, and an elongated lower die plate formed at a short end in the desired trailing end-of-filmstrip configuration, whereby the filmstrip is captured between the upper and lower plates, in which the upper punch plate further comprises, a raised rib formed along a bottom outer edge of the short end for shearing the filmstrip, and features protruding below the short end of the upper punch plate for cooperating with matching apertures formed in the short end of the die plate, wherein the protruding features pierce the filmstrip to form perforations.

In another aspect of the invention there is provided a punch and die assembly for re-shaping the trailing end of a filmstrip having a physical end to provide an end-of-filmstrip perforation for positively confirming the physical end of the re-shaped filmstrip comprising: a lower die plate having a re-shaping end formed in a desired end-of-filmstrip configuration and an end-locating aperture formed in a first edge of the die plate at an end-locating distance from a re-shaping end, for receiving the filmstrip in need of re-shaping; and an upper punch plate contacting the die plate, the upper punch plate having a raised rib formed along a bottom of an outer edge of a film re-shaping end of the punch plate in the desired end-of-filmstrip configuration for cooperating with the re-shaping end of the die plate to shear the filmstrip, and an end-locating post protruding from a first edge of the punch plate at an end-locating distance from the rib for cooperating with the end-locating aperture to perforate the filmstrip; wherein upon full actuation of the punch plate against the die plate the filmstrip is re-shaped and provided with an end-locating perforation for positively confirming the physical end of the filmstrip.

In another aspect of the invention there is provided a method for cutting and desplicing a roll of spliced film being drawn from a supply reel along a film path through an apparatus to form filmstrips and simultaneously re-shaping the leading and trailing ends of the despliced filmstrips in their desired configurations comprising the steps of: transporting the film along the film path under the influence of an encoder-controlled motor responsive to a control device for interrupting movement of the film; guiding the transported film along the film path with a plurality of flexible guides and moveable guides to position the splice for cutting, the flexible guides and the moveable guides being responsive to misaligned splices on the film, each of the flexible guides comprising a flexure track assembly mounted on both sides of the film path, the flexure track assembly further comprising a flexure track on one side of the film path for pressing against one film edge and a registration track on the other side of the film path for receiving the other film edge; sensing a film splice and signaling the control device to stop the motor with the splice of the stationary film in position for cutting; aligning the stationary film with a moveable alignment guide located adjacent to a punch and die assembly for re-shaping a filmstrip end, the moveable alignment guide comprising, a pair of fixed edge guides located on either side of the film path and a pair of moveable edge guides located on either side of the film path above the fixed edge guides so that the film is positioned on the moveable edge guides for cutting the splice; cutting the splice with a blade to form two filmstrip ends with residual splices thereon; retracting the moveable edge guides beyond the film edges to allow the filmstrip to drop onto the fixed edge guides; re-aligning the filmstrip on the fixed edge guide in cooperation with the flexible guides for precise positioning of the filmstrip over a die for re-shaping the end of the filmstrip; and actuating a punch plate against a matching die plate, both plates being configured in the desired end-of-filmstrip configuration, whereby the filmstrip is captured between the plates, the filmstrip is re-shaped and the residual splice is sheared off.

In another aspect of the invention there is provided a method for re-shaping the trailing end of a filmstrip having a physical end and providing an end-locating end-of-filmstrip perforation for positively confirming the physical end of the re-shaped filmstrip comprising the steps of: capturing the trailing end of the filmstrip in a punch and die assembly comprising, a lower die plate having a re-shaping end formed in a desired end-of-filmstrip configuration and an end-locating aperture formed in a first edge of the die plate at an end-locating distance from the re-shaping end, for receiving the filmstrip in need of re-shaping, and an upper punch plate contacting the die plate having a raised rib formed along the bottom of an outer edge of the film re-shaping end of the punch plate in the desired end-of-filmstrip configuration for cooperating with the re-shaping end of the die plate to shear the filmstrip, and an end-locating post protruding from the first edge of the punch plate at an end-locating distance from the rib for cooperating with the end-locating aperture to perforate the filmstrip; actuating the punch plate against the die plate; shearing off the end of the filmstrip to form the desired end-of-filmstrip shape; and perforating the filmstrip to form the end-locating end-of-filmstrip perforation.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

BRIEF DESCRIPTION OF THE DRAWINGS

FIG. 1 is an angled plan view of the front of the apparatus of the invention.

FIG. 5 is a front plan view of a punch and die assembly of the invention.

FIG. 6 is a cross section view of a punch and die assembly of FIG. 5.

FIG. 9 illustrates examples of the leading and trailing ends of a film.

FIG. 10 illustrates an example of a film with exposure area film features.

FIG. 11 illustrates an example of a filmstrip with an end-of-filmstrip feature.

FIG. 12 illustrates another example of a filmstrip with an end-of-filmstrip feature.

DETAILED DESCRIPTION OF THE INVENTION

Figure 1A:
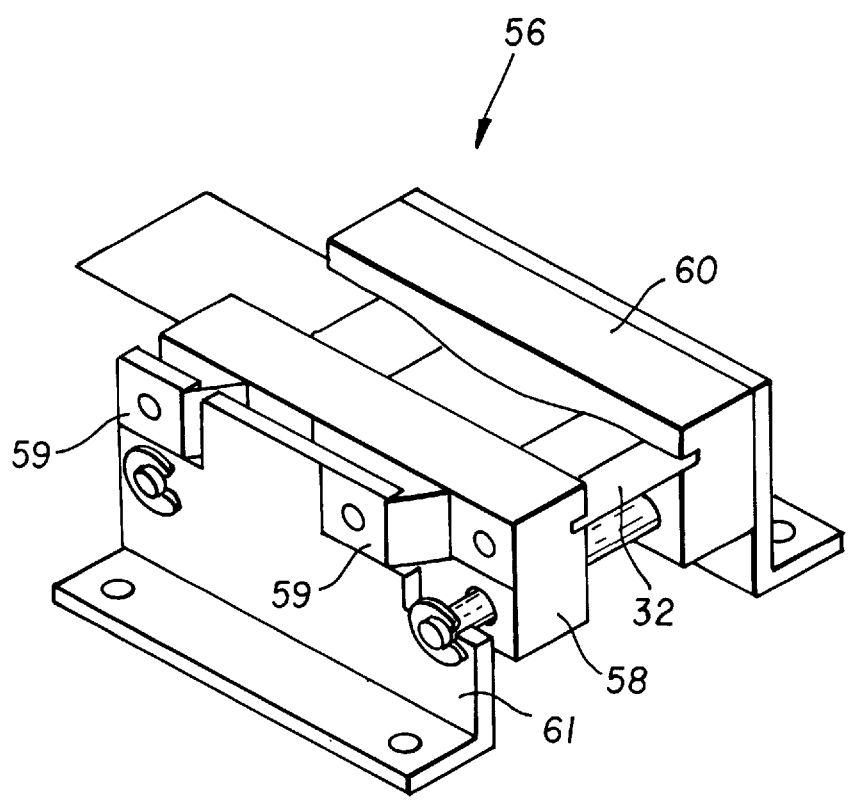
FIG. 1a is an enlarged view of a flexure track assembly.

Although different film sizes can be used with the device of this invention, the invention is disclosed as being embodied preferably for re-shaping film for loading in a 35 mm-like cartridge (cassette) or for use with associated photo finishing equipment. Because such a film is well known, this description is directed in particular to photographic elements forming part of or cooperating directly with the disclosed embodiment. However, other film sizes also fall within the invention. It is to be understood, however, that other elements not specifically shown or described may take various forms known to persons of ordinary skill in the art.

The device of this invention is designed for use in re-shaping and re-forming the ends of filmstrips with shapes which are not simply square cut with rectangular-shaped ends as used, for example, in splicing operations. Square cut ends can be readily formed by cutting with a blade or guillotine like devices. An apparatus of this invention provides filmstrip ends featuring, for example, tapered, arcuate and other non-rectangular shapes, with and without notches or perforations.

The apparatus for cutting and desplicing a roll of spliced film and re-shaping the cut ends will first be described generally with particular reference to FIGS. 1–2 which are plan views of the front and top respectively, of a preferred embodiment of the apparatus. As will be demonstrated the apparatus is designed to receive and transport a spliced roll of film, position the spliced film for cutting and re-shaping of the filmstrip ends, and then to transport the separated filmstrips beyond the apparatus for further processing operations. In the following description it should be understood that the guiding and transporting components of the apparatus act on the spliced film as well as the despliced filmstrips unless it is stated otherwise.

Referring to FIG. 1, the film splice cutting and re-shaping apparatus 30 receives a roll of spliced film 32 from a supply reel (not shown) at one end 34. The film 32 is drawn along a path through the apparatus 30 by a transport system from left to right in the direction of the arrows A and exits at the other end 36 of the apparatus 30. In the preferred mode of operation the trailing end of the film enters the film path first so that when a splice is positioned for cutting the leading end is on the right and the trailing end is on the left of the cutting blade 72. The film transport system includes first and second film movers 37, 39, each film mover including, for example, one of a pair of zero constraint pressure rollers 38, 40 which are biased against the upper surface of the film and one of a corresponding pair of axially compliant drive rollers 42, 44 which are in contact with the under surface, usually the emulsion side, of the film. Each of the film movers 37, 39 also comprises an encoder-controlled motor connected to each drive roller 42, 44 for controlling movement of the film 32 along the film path. The drive rollers 42, 44 are driven by corresponding encoder-controlled motors 46, 48, for example variable speed or stepper motors, to transport the film through the apparatus. Such encoder-controlled motors are well known and are linked to a control circuit programmed to interrupt the movement of the film along the film path, in response to a sensor, for positioning and cutting the splice and for film re-shaping operations. The control circuit or logic circuit signals the sequence of operations according to predetermined specifications. On completion of the re-shaping operations the motors 46, 48 are signaled to restart and the filmstrips are transported beyond the apparatus.

A plurality of flexible guides, for example first, second, third and fourth flexible guides, such as flexure mounted track assemblies 50, 52, 54, 56, are mounted, as shown, in back of and in front of each of the film movers 37, 39. In another embodiment of the invention fewer flexible guides, for example, one located adjacent to each transport assembly, may be used. Each flexure mounted track assembly serves to guide the spliced film along the film path. Each track assembly, for example track assembly 56, includes a flexure track 58 for pressing against one film edge and a registration track 60 for receiving the other (or opposite) film edge and a support bracket 61. The flexure track assemblies can accommodate film which is misaligned due to skewed splices and keep it accurately positioned for movement into and out of the cutting and re-shaping components. When the film 32 is stationary and the splice has been cut the flexible guides 50, 52, 54, 56 adjust to any lateral movement of the filmstrips resulting from dividing the film. The flexure track assemblies 50, 52, 54, 56 are provided with springs 59 which force the flexure track 58 against the film and the film against the registration track 60. The springs 59 yield to small deviations in the alignment of a spliced film as it travels through the guide then rebound to maintain the tracks parallel to the film edges.

FIG. 1a illustrates an enlarged, partially cut-a-way view of the flexure track assembly 56 and one of the springs 59. The spring 59 is generally Z-shaped and is mounted between the flexure track 58 and a support bracket 61 of the flexure track assembly 56. The filmstrip 32 is positioned between the flexure track 58 and the registration track 60.

Adjacent and downstream from the track assembly 52 there is mounted a first punch and die assembly 62 (see FIGS. 5 and 5a) which is configured for re-shaping the trailing end of the cut filmstrip. In a preferred configuration, the punch plate 82 is provided with posts 91, 93, 101 protruding from the underside of the punch plate at desired locations for piercing the filmstrip. The die plate 84 is provided with apertures 98, 99, 100 corresponding to the posts in the punch plate for cooperating with the posts to form perforations in the filmstrip at the desired locations. A raised rib 86 is formed along a portion of the outer edge of the end of the punch plate 82 in the shape of the desired trailing end-of-filmstrip configuration and the corresponding end of the die plate 84 is shaped with a matching configuration. Activation of the punch plate 82 against the die plate 84 causes the rib 86 to shear off the end of the filmstrip and the posts 91, 93 to perforate the filmstrip.

Adjacent and upstream from the track assembly 54 there is mounted a second punch and die assembly 64 which is configured for re-shaping the leading end of the cut filmstrip. This assembly operates in a similar manner as the first punch and die assembly 62. In a preferred leading end configuration (see FIGS. 5 and 5a) there are no perforations required and thus no protruding posts or apertures are formed on the plates. A raised rib 87 is formed along a portion of the outer edge of the end of the punch plate 85 in the shape of the desired leading end-of-filmstrip configuration and the corresponding end of the die plate 89 is shaped with a matching configuration. A second punch and die assembly with protruding features and corresponding apertures is readily incorporated in this apparatus if perforations in the leading end of the filmstrip are desired.

Figure 4:
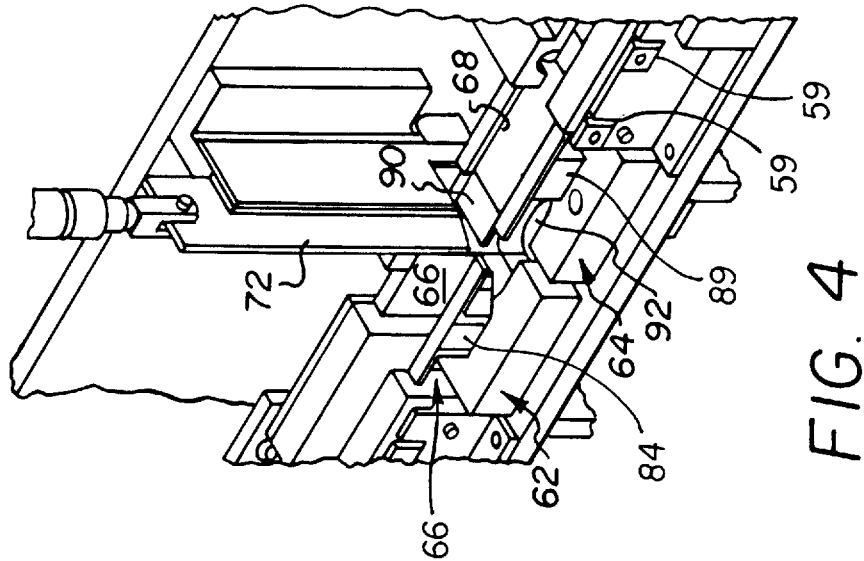
FIG. 4 is a cut away view of a splice cutter of the invention.

As illustrated in FIG. 4, mounted adjacent to the die plate 84 of the first punch and die assembly 62 there is positioned a first moveable film alignment guide 66 for guiding the spliced film 32 into the cutting assembly 70 and precisely aligning the cut filmstrip while the trailing end is re-shaped. Mounted adjacent to the die plate 89 of the second punch and die assembly 64 there is positioned a second moveable film alignment guide 68 for guiding the spliced film 32 into the cutting assembly 70 and precisely aligning the cut filmstrip while the leading end is re-shaped. The structure and operation of these alignment guides 66, 68 are described in detail below with reference to FIG. 7.

A splice cutter 70 is mounted between the first and second punch and die assemblies 62, 64. A preferred cutting assembly is a guillotine 70 which includes a cutting blade 72 and a blade guide 74 which are described in detail below, with reference to FIGS. 3 and 4.

Figure 2:
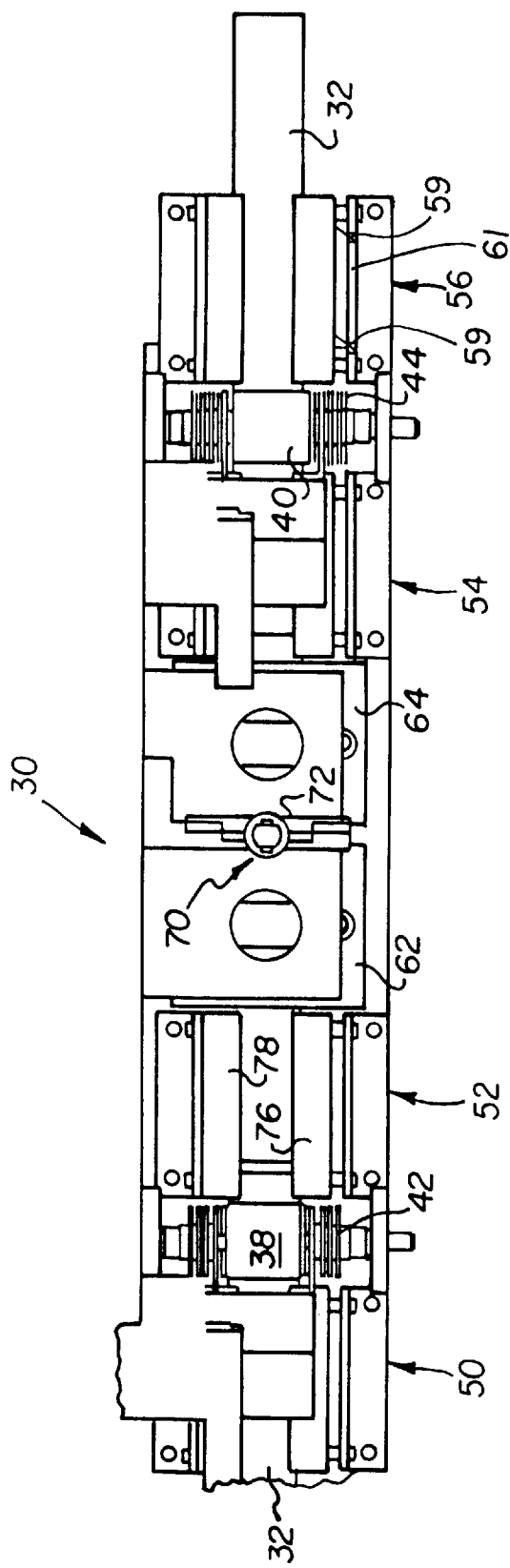
FIG. 2 is a top plan view of the apparatus of the invention.

Referring to FIG. 2, a top plan view of the apparatus 30, there is shown the relative position of the elements of the apparatus described for FIG. 1 along the path of a spliced film 32. The flexure mounted track assemblies 50, 52, 54, 56 are identical and one embodiment is now described in more detail. Track assembly 52, located upstream of the punch and die assembly 62 and guillotine 70 includes a flexure track 76 for supporting the film and yieldably pressing against one film edge and a fixed registration track 78 for supporting and receiving the other film edge. The track assembly 52 flexes in response to variations in the cut quality of the film edge or inaccuracies due to film splices thus allowing misaligned splices to travel through the track assembly 52 onto the moveable alignment guide 66 located adjacent to the first punch and die assembly 62. After cutting the splice the flexure track assembly 52 adjusts to the repositioning of the filmstrip. After re-shaping the filmstrip end and removal of the splice the flexure track assembly 52 again adjusts to repositioning of the filmstrip 32 and guides the cut filmstrip as it continues along the film path. The flexure track assembly 54 in front of the second punch and die assembly 64 receives the spliced film and, in the same manner as track assembly 52, accommodates misaligned film. After cutting and re-shaping the filmstrip end the flexure track assembly 54 adjusts to any repositioning of the filmstrip required and guides the cut filmstrip as it continues along the film path. In this embodiment of the invention the additional flexure track assemblies 50 and 56 further ensure guiding and positioning of the film are accurate as film 32 travels along the film path.

Figure 3:
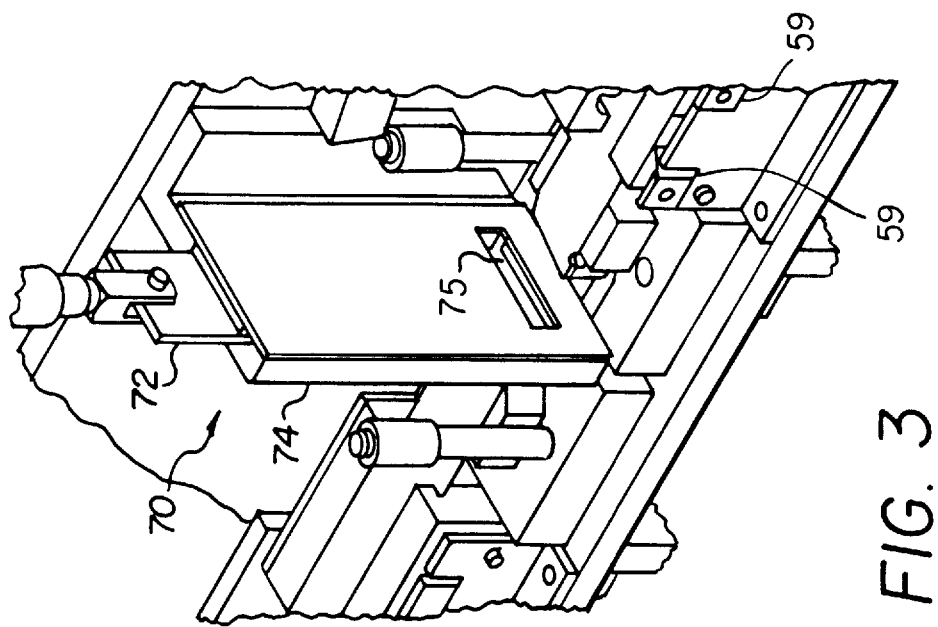
FIG. 3 is an angled plan view of a splice cutter of the invention.

Referring to FIG. 3 the guillotine 70 is more clearly shown. A blade 72 slides in a blade guide 74. The blade guide 74 is provided with a horizontal slit 75 through which the film is drawn and within which a film splice is positioned for cutting. Referring again to FIG. 4, the blade guide 74 is partly cut away to show the blade 72 positioned above a film splice 90. Below the splice 90 an aperture 92 is shown which allows the splice to drop down into a container below the apparatus 30. In one embodiment of the invention, since the film is under some tension a cutting blade 72 cuts the unsupported splice by a knifing action. In another embodiment a compliant pad is removably positioned to support the splice against the thrust of the blade. In yet another embodiment a pair of blades, one above and one below the film plane, cut the splice with a shearing action.

Figure 5A:
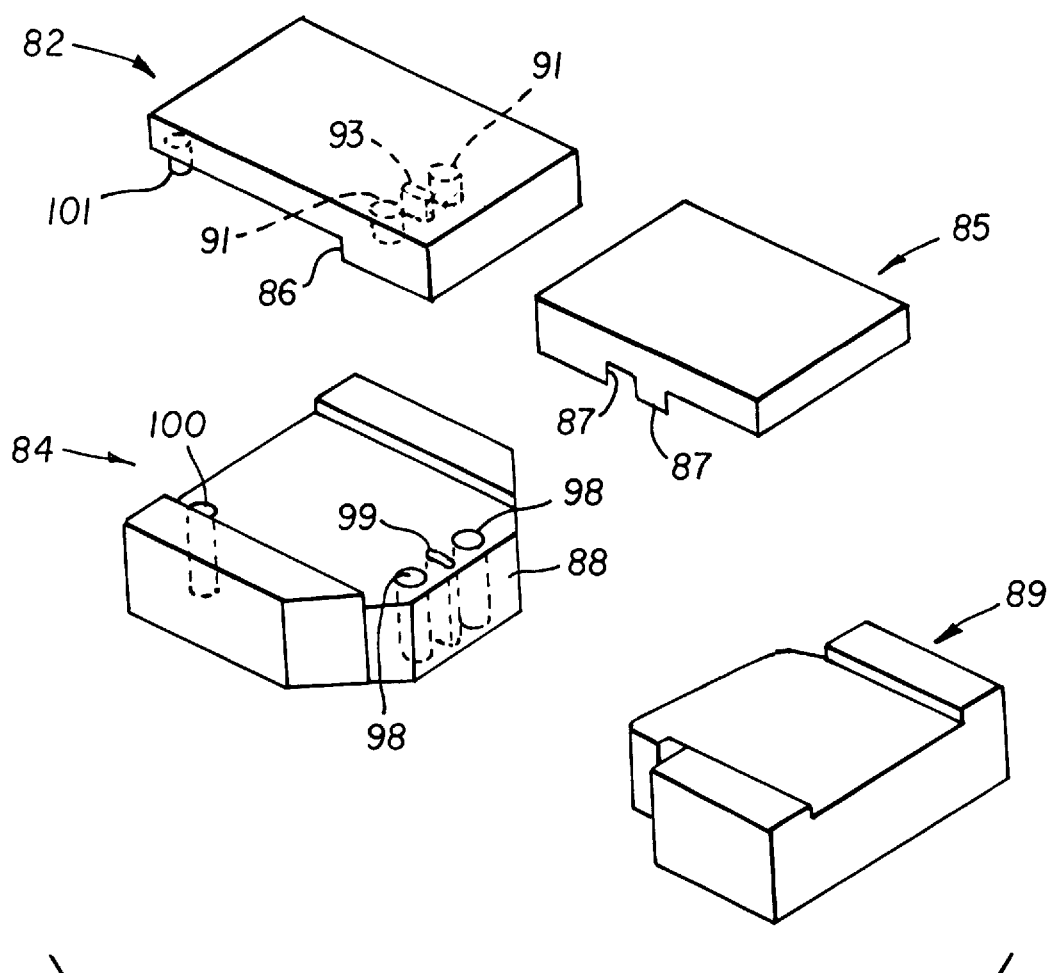
FIG. 5a illustrates an exploded, partial view of the punch and die assemblies.

Referring to FIG. 5 there is shown a front view the apparatus 30 in which the first and second die assemblies 62, 64 are shown in greater detail. Each of the assemblies is constructed in the same manner and vary only in the configuration of the plates. Assembly 62 includes a fixed stroke cylinder 80 connected to a punch plate 82, through support plate 94. The punch plate 82 travels down a guide post 83 and contacts the matching die plate 84. Referring to FIGS. 5 and 5a, protruding from the underside of the punch plate 82 is a raised rib 86 for shearing the filmstrip and, when desired, appropriate posts for piercing the filmstrip. The die plate 84 has matching receptacles for receiving the punch plate protruding features and a shearing block 88 for mating with the rib 86. A stripper plate 96 is usually attached to the punch plate 82 to assist in release of the filmstrip after the re-shaping operation.

In one embodiment of the punch and die assembly 62 for re-shaping the trailing end of a filmstrip, the re-shaping ends of the punch and die plates 82, 84 are each tapered down towards the end. The narrow end of the taper is at right angles to the long axis of the plate, and the protruding features and apertures are in a row adjacent to and aligned parallel with the narrow end. The end of the punch plate 82 is provided with round posts 91 and a generally obround-shaped post 93, while the corresponding end of the die plate 84 is provided with corresponding round apertures 98, and a generally obround-shaped slot 99 for receiving and co-operating with the posts 91, 93 respectively. In a preferred embodiment the generally obround feature/aperture is located between the two round features/apertures. A raised rib 86 for shearing the filmstrip is formed along a portion of the outer edge of the punch plate end in the shape of the desired end-of-filmstrip configuration which matches the configuration of the corresponding end of the die plate.

In another embodiment of the punch and die assembly for re-shaping the trailing end of a filmstrip the die plate 84 is provided with an end-locating aperture 100 at an end-locating distance from the re-shaping end of the die. The punch plate 82 is provided with a corresponding end-locating post 101 for co-operating with the aperture 100. Activation of the punch plate 82 against the die plate 84 will cause the end-locating post 101 to perforate the filmstrip and provide a perforation at an end-locating distance from the physical end of the trailing end of the re-shaped film. The post and aperture for the end-of-filmstrip feature are, for example, round or generally rectangular-shaped and are preferably located adjacent to a long edge of the corresponding punch and die plates respectively. In certain photographic systems this end-locating end-of-filmstrip feature is useful for positively confirming the physical end of the filmstrip and positioning the film for attachment and detachment operations. A description of a photographic film with such an end-locating end-of-filmstrip feature is described below.

Referring to FIG. 6, a cross section of the first punch and die assembly 62 viewed along the film path is illustrated. The fixed stroke cylinder 80, the guide posts 83, the support plate 94, the punch plate 82, the die plate 84 and the die shoe 97 of the assembly are clearly shown. The punch profile shows the raised rib 86 and the stripper plate 96 attached to the bottom of the punch plate. Mounted adjacent to the die plates 84, 89 are the moveable film alignment guides 66 which receive the film 32 and position the film for the cutting and re-shaping operations.

Figure 7:
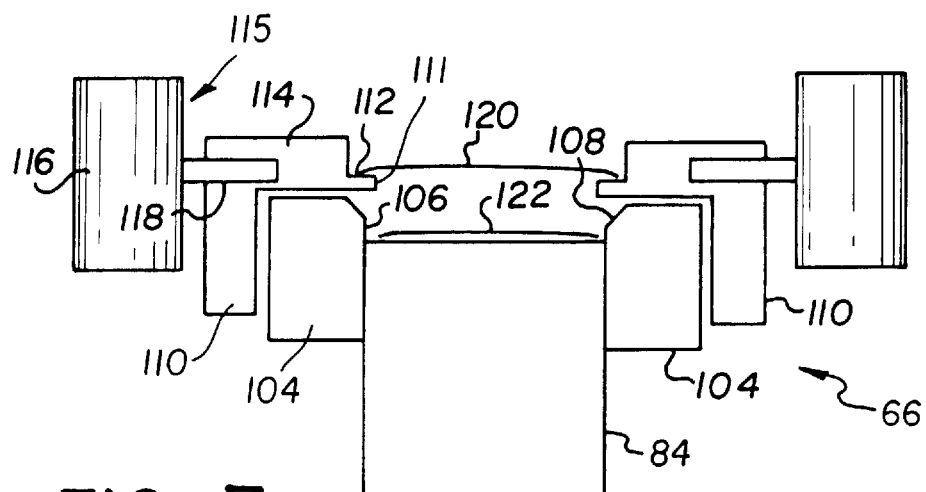
FIG. 7 is a plan view of a moveable alignment guide of the invention.

Referring to FIG. 7, a schematic drawing, not to scale, of an embodiment of the moveable film alignment guide 66, is illustrated. The moveable alignment guides for each punch and die assembly are identical and the following description applies to either of the first and second moveable alignment guides 66, 68. Each of the moveable alignment guides 66, 68 includes first and second fixed edge guides 104, first and second film alignment, moveable edge guides 110 and first and second retractors 115 respectively. The moveable alignment guide 66 is mounted over each side of a die plate 84. The moveable alignment guide 66 includes first and second generally rectangular-shaped fixed edge guides 104 which are positioned with one fixed edge guide on either side of the film path. Each fixed edge guide 104 has an inside edge 106 with a corner 108 cut away at an acute angle slightly above the film path. The first and second generally L-shaped moveable edge guides 110 are positioned with one moveable edge guide slightly above and around the outside of each fixed edge guide 104, on either side of the film path. Each moveable edge guide 110 has a generally L-shaped shoulder 112 on the inside edge of the leg 114 of the moveable edge guide 110 which extends over the fixed edge guide 104. The moveable edge guides 110 are capable of being moved in and out of the film path. The edge 111 of the shoulder 112 which contacts the filmstrip is preferably chamfered or beveled to enable insertion of the shoulder 112 under the film. Connected to the moveable edge guides 110 are first and second retractors 115 for retracting the moveable edge guides 110, such as a pair of pancake air cylinders 116 connected to the moveable edge guides 110 with rods 118. The release of air from the cylinders 116 retracts the moveable edge guides 110 while pressurization of the air cylinders repositions the moveable edge guides 110 to insert the shoulders 112 under the edges of a filmstrip. Other means for moving the guides in and out are well known to those with skill in the art and are also contemplated by this invention. A filmstrip 32 supported by the shoulders 112 of the moveable edge guides 110 is shown. Retraction of the moveable edge guides 110 allows the film to drop onto the angled corners 108 of the fixed edge guides 104 and then between the inside edges 106.

In operation of the apparatus 30 of the invention a roll of spliced film 32 is drawn from a supply reel (not shown) onto the series of flexible guides 50, 52, 54, 56 and moveable alignment guides 66, 68 which are responsive to misaligned splices on the film. Film 32 is moved along the film path by encoder-controlled motors 46, 48 via drive rollers 42, 44. The film travels through the slit 75 of the blade guide 74 and as the spliced film moves along the film path all four flexure tracks, including tracks 58 (FIG. 1) and 76 (FIG. 2), of first, second, third and fourth flexible guides 50, 52, 54 and 56, adjust to accommodate any misaligned splices. The moveable alignment guides 66, 68 receive the film on the shoulders 112 of the moveable edge guides 110. Once the splice 90 is positioned beneath the cutting blade 72 a sensor, for example optical sensor 95 (FIG. 4a), signals a control circuit (not shown) and causes the transport motors 46, 48 to be stopped and then the cutting, re-aligning and re-shaping operations are initiated. The cutting of the splice is carried out while the film is supported on the shoulders 112. After the splice is cut, the moveable edge guides 110 are withdrawn by the retractors 115, for example, by releasing air from the pancake cylinders 116, to allow the filmstrips to drop between the fixed edge guides 104. The flexure tracks 58 again adjust to any lateral movement of the filmstrips as a result of the splice being cut, and keep the filmstrip ends aligned over the die plates 84, 89. The punch plate 82, preferably with a stripper plate 96 attached, is lowered and presses the filmstrip down between the inside edges 106 of the fixed edge guides 104 where it is finally positioned and aligned for the re-shaping operation. The punch plate 82 is actuated against the film and the die plate 84 to shear the splice off and re-shape the cut-end of the film in the desired configuration. The residual splice portions of the film drop into a container positioned below the blade guide 74. As the punch plate 82 is withdrawn the stripper plate 96 releases the film, the pancake air cylinders 116 of the retractors 115 are pressurized and the moveable edge alignment guide shoulders 112 are moved under the edges of the filmstrip 32. The gap between the lower fixed edges 106 and the shoulders 112 of the moveable edge guides 110 is so small, for example between about 5 to 10 mils, that the shoulders 112 are readily inserted under the film. The motors 46, 48 are signaled to restart and the re-shaped filmstrips are transported along the film path until the next splice on the roll of film is detected and positioned for cutting. The slight elevation of the filmstrip over the dies ensures that the filmstrip ends which have a tendency to curl anticlastically pass through the blade guide slit 75 and clear the ends of the die plates 84, 89.

Figure 4A:
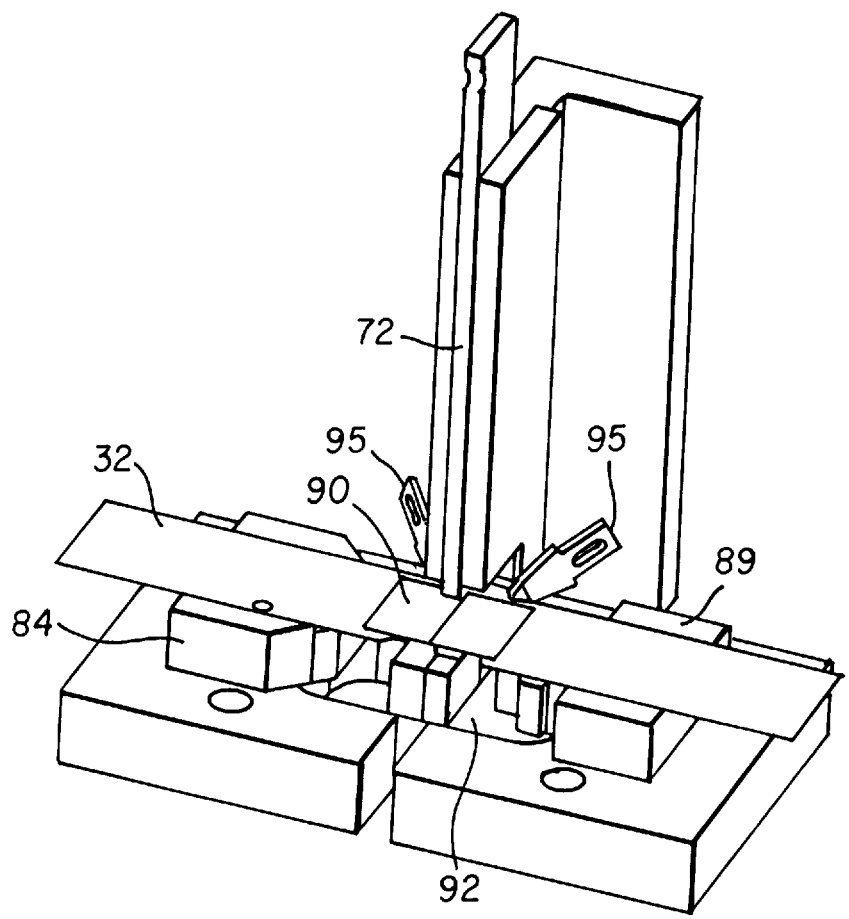
FIG. 4a illustrates an optical sensor.

The sensor can be any conventional sensor, for example an optical sensor, which is encoded to recognize features on the roll of spliced film 32. For example, optical sensors can be located in the base (die shoe 97) of the punch and die assemblies 62, 64 or the die plates 84, 89 to detect the edges of the film on either side of the splice and thereby center the splice under the cutting blade 72. Alternatively, as shown in FIG. 4a, the edges of the splice 90 or indicia on the splice surface can be detected by positioning the optical sensor 93 above the film path. In yet another method a film feature, such as the end-locating end-of-filmstrip perforation 164 (FIG. 10) which is directly related to the end of the filmstrip can be detected by a sensor located in the die plate. Such sensors will then signal a controller to stop the encoded motors so that the splice is centered beneath the cutting blade, and initiate a programmed sequence of operations for cutting, aligning and re-shaping the filmstrip ends.

Figure 8:
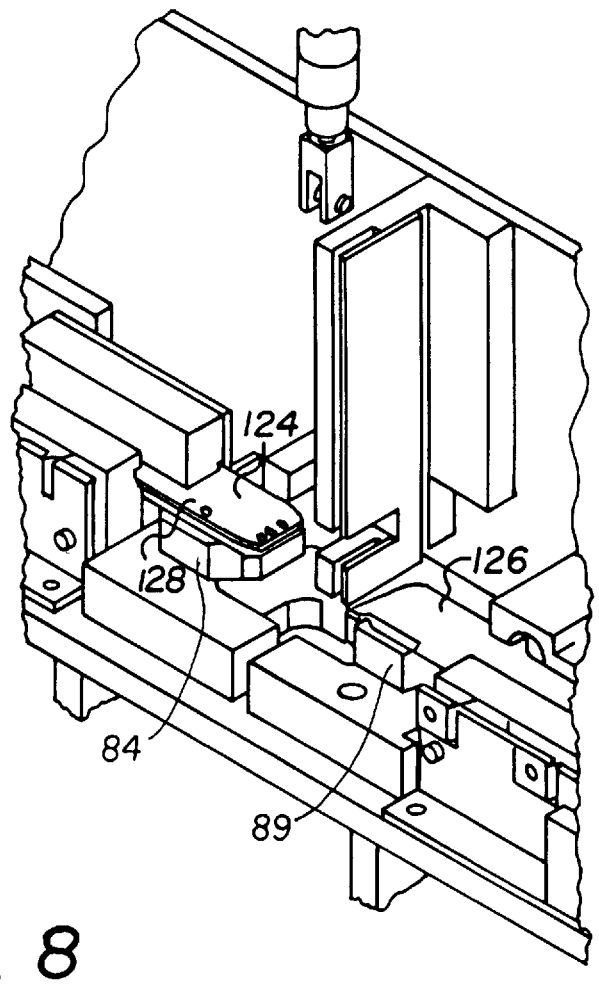
FIG. 8 is a cut-away view of the re-shaping dies of the invention.

Referring to FIG. 8 the re-shaped trailing end 124 and the re-shaped leading end 126 of the de-spliced filmstrip are shown on the respective die plates 84, 89. The moveable film aligning guide 66 and portions of the blade and blade guide have been removed for clarity. Also shown for the trailing end 124 is an end-locating end-of-filmstrip perforation 128 which is formed at an end-locating distance from the end of the filmstrip for positively confirming the physical end of the filmstrip. This feature is described in more detail with reference to FIGS. 9–12.

FIGS. 9–12 describe film for use in certain photographic systems having a feature that is directly associated with the end of a filmstrip trailing end for positioning the physical end of the filmstrip prior to an attachment or detachment operation.

Referring to FIG. 9, an example of a film 150, with known exposure area features is shown. The trailing end of the filmstrip 152 has first and second exposure features in the form of perforations at locations 154 and 156 respectively adjacent to the edges of the filmstrip which are directly related to the exposure area of the filmstrip and signal to a camera or photo finishing equipment that the last exposed frame has been reached. These perforations are preformed during manufacture of the unexposed film. Because of film damage which can result from abuse or necessary processing operations it is sometimes necessary to re-shape or re-form the physical end of the filmstrip so that the film can be re-attached to a film holding device. This is accomplished by positioning the filmstrip in a film re-shaping device which can re-form the end of the filmstrip by cutting off the damaged end and re-shaping and perforating the filmstrip in the desired end-of-filmstrip configuration. When this is done the film is shortened and the relationship between the exposure area features and the physical end of the filmstrip changes. Thus an exposure feature cannot be used by itself to determine the physical end of the filmstrip.

Referring to FIG. 10, there is shown an example of a filmstrip 160 having a trailing end 162 in which a film feature, for example, a perforation hole 164 is located at a precise, end-locating distance from the physical end of the filmstrip to form an end-locating end-of-filmstrip perforation. The perforation is located at a distance from the end of the filmstrip which is short of the film exposure area and greater than the length of film remaining inside a corresponding film cartridge when the film is fully withdrawn and is still attached to the spool core. Thus the perforation is outside the cartridge and can be detected by a sensor for determining the physical end of the filmstrip. Also shown is a leading end of the filmstrip 166 which is shaped in a desired configuration for interacting with features of a film cartridge. The end-locating end-of-filmstrip feature 164 may have any suitable shape or dimension, for example, a circular hole or rectangular slot, which can be located by a sensor. In a preferred embodiment the end-locating feature is in the form of a circular perforation.

The sensor can be any suitable device, for example an optical sensor or equivalent device, which senses the presence of the end-locating end-of-filmstrip perforation and signals a logic or control device to activate a piece of equipment for use in attaching or detaching the filmstrip.

When it is necessary to re-shape or re-form the end of the filmstrip a new end-locating end-of-filmstrip perforation would be created and located at the same end-locating distance from the new end of the filmstrip as the old end-locating perforation was from the end of the original filmstrip. The end-locating perforation is preferably located adjacent to an edge of the filmstrip. Such a location at the edge of the filmstrip is more convenient for cooperating with sensing equipment and other features on the filmstrip.

In some photographic systems the film is reloaded into the customers cartridge. When this is done it is necessary to position the filmstrip so that the correct length of film is fed into the cartridge for attaching to the spool. The end-locating end-of-filmstrip feature 164 allows accurate determination of this length and also helps align the film with the cartridge. Similarly when such a film is removed from the cartridge or a film holding device, detection of the precise position of the end of the film is needed to signal equipment used to release the film from the film holder.

Referring to FIG. 11, there is shown an example of a film 170 in which the exposure perforation 172 and the end-locating end-of-filmstrip perforation 174 at the trailing end 176 of the filmstrip are preferably adjacent to the same edge of the film and are aligned in a longitudinal direction. The exposure perforation is more remote from the end of the film than the end-locating end-of-filmstrip perforation. In another embodiment of the invention the exposure perforation or feature serves as an anticipation feature for alerting the sensor and signaling the control device to wait until the next perforation is sensed before activating equipment. The exposure features 154 and 156, FIG. 8, can be used separately or in combination as anticipation features.

In a typical detachment operation in which the end of the film is being removed from an apparatus, such as a film cartridge or a processing spool the filmstrip would be removed using nip rollers or other known means for film removal. An optical sensor or equivalent device would sense the presence of the end-locating end-of-filmstrip perforation during the removal. The logic or control device would be programmed to stop removal of the filmstrip and the physical end of the filmstrip would be identified and precisely located. Alternatively the sensor would sense the presence of the exposure perforation during the removal and the logic or control device would be programmed to wait until the next perforation, for example the end-locating end-of-filmstrip perforation, is sensed. The logic device would then stop removal of the filmstrip and the physical end of the filmstrip would be identified and precisely located. The filmstrip is then detached from the apparatus by a suitable means for detaching the filmstrip end.

For some photographic systems, in order to limit the length of unused film, the end-locating end-of-filmstrip perforation is located, for example, at about 38 mm from the physical end of the filmstrip and centered 2 mm from the edge of the filmstrip. This allows for up to about three re-formings of a damaged end of the film, including a new end-of-filmstrip perforation, before the end of the film approaches too close to the end of the exposure area and it becomes inoperable. When an anticipation feature, for example an exposure feature, is present at the end of the exposure area then after three reforming operations the filmstrip is appreciably shorter and thus the exposure feature and the end-of-filmstrip perforation might overlap or interfere with each other.

FIG. 12 illustrates a filmstrip 180 in which a damaged end 182 of the filmstrip 180 is removed and a new end 184 is re-formed. Simultaneously a new end-locating end-of-filmstrip perforation 186 is formed. The old end-locating end-of-filmstrip perforation 188 remains but no longer serves any function. Since it is between the new end-locating end-of-filmstrip perforation and the end of the filmstrip it will not interfere with subsequent sensing of the filmstrip end and reforming operations.

The apparatus of the invention affords a method of handling a reel of processed, spliced film rolls for desplicing and re-shaping of the filmstrip ends, by providing a film guiding and aligning system which allows for splice misalignment. The apparatus enables accurate positioning of the film for re-shaping and handles the transport of "curly" film along the film path. By cutting the spliced film to remove the splice tape rather than using thermal desplicing methods, concern that adhesive residue on the film ends is being returned to the customer which might cause a future problem in a cartridge is eliminated.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. An apparatus for cutting and desplicing a roll of spliced film being drawn from a supply reel along a film path through the apparatus to form filmstrip leading and trailing ends and re-shaping each filmstrip end, the apparatus comprising:

a splice cutter located along the film path to cut the film at a splice to create a filmstrip leading end having a first residual splice and a filmstrip trailing end having a second residual splice;

a first die located below the film path and upstream from the splice cutter and a first punch for engaging the first die to re-shape a filmstrip trailing end and remove the first residual splice;

a second die located below the film path and downstream from the splice cutter and a second punch for engaging the second die to re-shape a filmstrip leading end and remove the second residual splice;

first and second film alignment guides located laterally adjacent to and above the first and second dies respectively, the alignment guides each having shoulders for supporting and aligning a filmstrip in the film path over the first and second dies and for returning a filmstrip to the film path after re-shaping;

a first fixed edge guide adjacent the first die and below the film path for receiving a filmstrip from the first film alignment guide and aligning a filmstrip trailing end with the first die;

a second fixed edge guide adjacent the second die and below the film path for receiving a filmstrip from the second film alignment guide and aligning a filmstrip leading end with the second die; and first and second retractors attached to the first and the second film alignment guides respectively for moving the first and the second film alignment guides in and out of the film path.

2. The apparatus according to claim 1, further comprising a plurality of flexible guides, at least one of the plurality of flexible guides located adjacent each of the first and second dies for aligning a filmstrip parallel to the film path, each flexible guide comprising a spring, a flexure track mounted to the spring for yieldably contacting an edge of a filmstrip, and a registration track for contacting an opposite edge of a filmstrip.

3. The apparatus according to claim 2, further comprising first and second film movers for transporting the film through the apparatus, and one of the first and second film movers located on each side of the splice cutter adjacent to one of the flexible guides.

4. The apparatus according to claim 1, in which each of the film movers comprises a zero constraint pressure roller mounted above the film path for biasing against a surface of the filmstrip and an axially compliant drive roller mounted below the film path in contact with an opposite surface of the filmstrip.

5. The apparatus according to claim 4 which each of the film movers further comprises an encoder-controlled motor connected to the drive roller for controlling movement of the film along the film path.

6. The apparatus according to claim 1, further comprising a sensor located along the film path, for sensing the film splice and signaling a control device to interrupt film transport while cutting and re-shaping of a filmstrip end is carried out.

7. The apparatus according to claim 1, in which the splice cutter comprises a guillotine, the guillotine further comprising a blade and a blade guide.

8. An apparatus for cutting and desplicing a roll of spliced film being drawn from a supply reel along a film path through the apparatus to form filmstrip leading and trailing ends and re-shaping each filmstrip end, the apparatus comprising:

first, second, third and fourth flexible guides sequentially located along the film path, for guiding a spliced film and a despliced film along the film path, each of said flexible guides comprising a spring, a flexure track mounted to the spring for yieldably contacting an edge of a filmstrip, and a registration track for contacting an opposite edge of a filmstrip;

first and second film movers for transporting the film through the apparatus, the first film mover located between the first and second flexible guides and the second film mover located between the third and fourth flexible guides, each of the first and second film movers comprising a zero constraint pressure roller for biasing against an upper surface of a film, an axially compliant drive roller in contact with an under surface of the film, and an encoder-controlled motor connected to the drive roller;

a first die located below the film path adjacent to a side of the second flexible guide remote from the first film mover, and a first punch located above the film path for engaging the first die to re-shape a filmstrip trailing end and remove a splice end;

a second die located below the film path adjacent to a side of the third flexible guide remote from the second film mover, and a second punch located above the film path for engaging the second die to re-shape a filmstrip leading end and remove a splice end;

a first film alignment guide located laterally adjacent to and above the first die, the first alignment guide having shoulders for supporting and aligning a filmstrip in the film path over the first die and for returning a filmstrip to the film path after re-shaping;

a first fixed edge guide adjacent the first die and below the film path for receiving a filmstrip from the first film alignment guide and aligning a filmstrip trailing end with the first die;

a second film alignment guide located laterally adjacent to and above the second die the second guide having shoulders for supporting and aligning a filmstrip in the film path over the second die and for returning a filmstrip to the film path after re-shaping;

a second fixed edge guide adjacent the second die and below the film path for receiving a filmstrip from the second film alignment guide and aligning a filmstrip leading end with the second die;

first and second retractors attached to the first and the second film alignment guides respectively for moving the first and the second film alignment guides in and out of the film path;

a guillotine having a blade and a blade guide, the guillotine located between the first and second dies, for cutting the splice; and a sensor located along the film path, for sensing the film splice and signaling a control device to interrupt film transport while cutting of the splice and re-shaping of a filmstrip end is carried out.

9. An apparatus for cutting and desplicing a roll of spliced film being drawn from a supply reel along a film path through the apparatus to form a filmstrip trailing end and re-shaping the filmstrip trailing end, the apparatus comprising:

a die located below the film path and a punch located above the film path for engaging the die to re-shape a filmstrip trailing end and remove a splice end;

a flexible guide located along the film path and upstream from the punch and the die for aligning a filmstrip parallel to the film path, the flexible guide comprising a spring, a flexure track mounted to the spring for yieldably contacting an edge of a filmstrip, a registration track for contacting an opposite edge of a filmstrip; and a film alignment guide located laterally adjacent to and above the die, the alignment guide having shoulders for supporting and aligning a filmstrip in the film path over the die and for returning a filmstrip to the film path after re-shaping;

a fixed edge guide adjacent the die and below the film path for receiving a filmstrip from the film alignment guide and aligning a filmstrip trailing end with the die; and a retractor attached to the film alignment guide for moving the film alignment guide in and out of the film path.

10. The punch and the die according to claim 9 for re-shaping a filmstrip trailing end, the filmstrip trailing end having an original end-of-filmstrip perforation located at a pre-selected distance from an original end of the filmstrip for positively confirming a physical end of the filmstrip, the punch and the die comprising:

a plurality of apertures in a re-shaping end of the die;

a plurality of matching posts protruding below a re-shaping end of the punch for mating with the plurality of apertures; and an end-locating aperture formed in a first edge of the die at the pre-selected distance from the re-shaping end; and an end-locating post protruding below the punch at the pre-selected distance from the re-shaping end of the punch for mating with the end-locating aperture.

11. The apparatus according to claim 10, in which the re-shaping end of each of the punch and the die is tapered and each re-shaping end is at right angles to a long axis of each of the punch and the die.

12. The apparatus according to claim 11, in which the re-shaping end of the punch further comprises a row of protruding posts and the re-shaping end of the die further comprises a row of matching apertures for mating with the row of protruding posts, in which each row is adjacent to and aligned parallel with each narrow end.

13. The apparatus according to claim 12 in which the row of apertures comprises a generally obround-shaped slot between two round holes, for providing the filmstrip with perforations for attaching the filmstrip to a film holder.

14. The apparatus according to claim 13, in which the row of protruding features comprises a generally obround-shaped post between two round-shaped posts.

15. The apparatus according to claim 2, in which the spring is generally Z-shaped.

* * * * *